United States Patent [19]
King et al.

[11] 3,862,781
[45] Jan. 28, 1975

[54] BRAKE CONTROL PROPORTIONING SYSTEM

[75] Inventors: Robert M. King, Royal Oak, Mich.; William E. Worman, Mesa, Ariz.

[73] Assignee: General Motors Corporation, Detroit, Mich.

[22] Filed: Nov. 14, 1973

[21] Appl. No.: 415,773

[52] U.S. Cl. .............................. 303/22 R, 303/6 C
[51] Int. Cl. .............................................. B60t 8/18
[58] Field of Search........ 303/6 A, 6 R, 22 A, 22 R, 303/23 A, 23 R, 24 F; 188/345

[56] References Cited
UNITED STATES PATENTS

| | | | |
|---|---|---|---|
| 3,697,138 | 10/1972 | Marting................................ | 303/6 C |
| 3,702,207 | 11/1972 | Armstrong....................... | 303/6 C X |
| 3,731,981 | 5/1973 | Bueler............................. | 303/6 C X |

Primary Examiner—Duane A. Reger
Attorney, Agent, or Firm—D. D. McGraw

[57] ABSTRACT

A vehicle brake system in which the brake circuit for the rear brakes has two proportioning valves in parallel flow relation with one proportioning valve being actuatable at relatively low input pressures to begin proportioning fluid to the brakes, and the other being actuatable at a substantially higher input pressure to begin proportioning fluid to the brakes. The control mechanism for establishing one or the other of the proportioning valves as the control proportioning valve includes a deceleration sensing device and a master cylinder output pressure sensing device and various controls to establish the appropriate proportioning valve as the control proportioning valve in relation to vehicle load, vehicle deceleration being a function of vehicle load.

5 Claims, 3 Drawing Figures

BRAKE CONTROL PROPORTIONING SYSTEM

The invention relates to a brake control system for proportioning brake supply pressure to brake apply pressure, and more particularly to one which senses a variable vehicle operational condition such as vehicle loading. The system includes a source of brake supply pressure such as a master cylinder, front and rear vehicle brakes which are actuatable by brake apply pressures received from the source of brake supply pressure, fluid conduits interconnecting the brakes and source of brake supply pressure, a plurality of brake pressure proportioning valves in some of the conduits each having a different brake supply pressure point at which they begin to proportion, and control means responsive to a variable vehicle operational condition such as the amount of vehicle deceleration obtained compared with the amount of brake supply pressure provided to establish a curvilinear relationship therebetween and to selectively integrate one or more of the proportioning valves into operational fluid pressure relationship between the source of brake supply pressure and at least some of the vehicle brakes in accordance with a predetermined desired curvilinear relationship between the brake supply pressure and the variable vehicle operation condition as compared to the established curvilinear relation.

The variable vehicle operational condition preferably utilized is vehicle deceleration as a function of vehicle load. This is particularly important in vehicles such as trucks wherein the gross vehicle weight in loaded and unloaded conditions will vary greatly and have a very pronounced effect on vehicle braking. A light vehicle, such as an unloaded truck, requires much less master cylinder pressure to stop at any desired deceleration than does the same vehicle when heavily loaded. The system embodying the invention establishes a decision line between the master cylinder output pressure that is required to stop a lightly loaded vehicle at various decelerations to that required to stop a heavily loaded vehicle at various decelerations. The system and the control mechanism forming a part of the invention use this decision line to determine whether or not the vehicle is acting as a lightly loaded vehicle or a heavily loaded vehicle during braking. If the system determines that the vehicle is on the lightly loaded side of the decision line, it establishes a relatively low pressure proportioning valve as the controlling proportioning valve so that the brake apply pressure received by the rear brakes is proportioned beginning at a relatively low master cylinder output pressure level. If the system determines that the vehicle is on the heavily loaded side of the decision line, it establishes a substantially higher input pressure proportioning valve as the controlling proportioning valve so that a substantially higher master cylinder output pressure input is attained before the proportioning valve begins to proportion the brake apply pressure to the rear brakes.

In its more particular aspects, the invention relates to electrical circuitry which controls fluid circuits in the rear brake circuit of a dual circuit brake system for a vehicle to establish a low pressure operating proportioning valve as the control proportioning valve when the vehicle is lightly loaded and to establish a high pressure operating proportioning valve as the control valve when the vehicle is heavily loaded.

The principle of the system is also utilized in copending application Ser. No. 415,566, filed on even date herewith and entitled, "Proportioning Valve System for Rear Braking Circuit" and assigned to the common assignee. The specific arrangement disclosed and claimed in that application provides a mechanical-hydraulic system. The specific control arrangement disclosed herein embodies the principles of the invention in an electro-hydraulic control system.

In the drawings:

FIG. 1 is a schematic illustration of a vehicle brake system embodying the invention.

Figure 2:
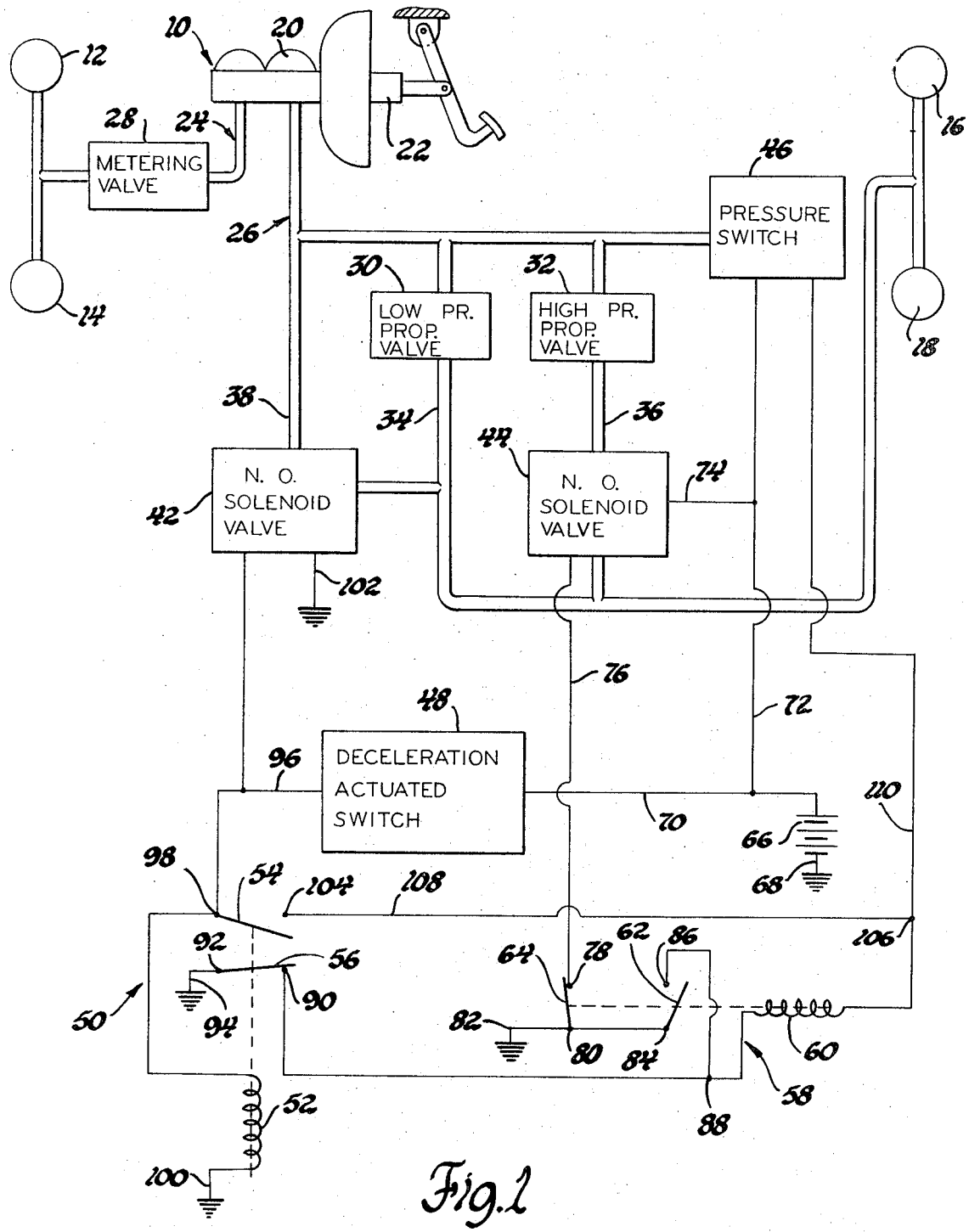
FIG. 2 is a graphic illustration of a typical decision line and the performance of a lightly loaded and a heavily loaded vehicle, with the master cylinder pressure being plotted against vehicle deceleration.
Figure 2:
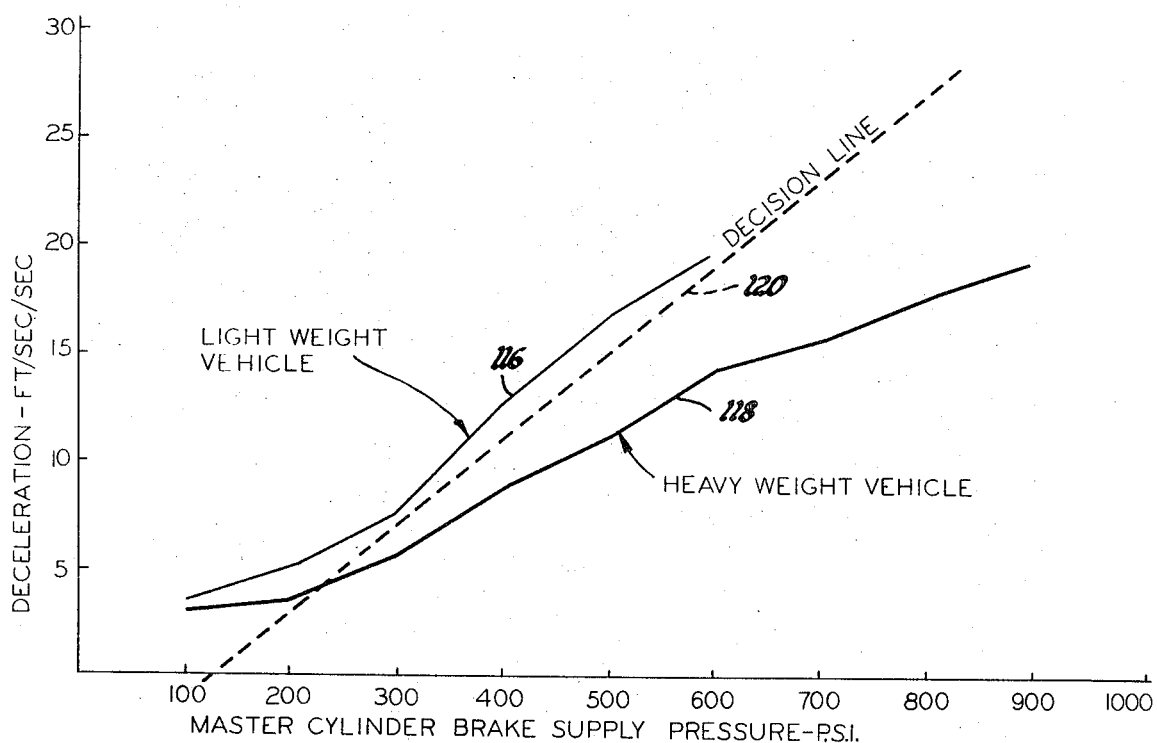

The vehicle brake system 10 of FIG. 1 is illustrated as being installed in a vehicle having a pair of front brakes 12 and 14 and a pair of rear brakes 16 and 18. A master cylinder 20 is schematically illustrated as being actuatable by the brake booster and pedal assembly 22 to provide brake fluid under pressure to the brakes. The system is of the dual circuit type with one conduit 24 connected to the front brakes 12 and 14 and another conduit 26 connected to the rear brakes 16 and 18. As is common in the art, the master cylinder has separate pressurizing chambers for the two brake circuits represented by conduits 24 and 26. In a vehicle with front disc brakes and rear drum brakes a metering valve 28 is also provided in conduit 24.

The rear brake circuit includes a first proportioning valve 30 and a second proportioning valve 32 which are positioned in parallel fluid flow relation in separate branches 34 and 36 of conduit 26. A third branch 38 of conduit 26 is in parallel flow relation with branches 34 and 36 and like them reconnects with the portion of conduit 26 directly connected to the rear brakes. A normally open solenoid valve 42 is positioned in conduit branch 38 and permits fluid pressure and flow to be delivered from the master cylinder to the rear brakes without any proportioning action unless the solenoid valve is energized. Another normally open solenoid valve 44 is positioned in conduit branch 36 between the proportioning valve 32 and the connection of conduit branch 36 with the portion of conduit 26 leading to the rear brakes 16 and 18. When the solenoid of this valve is deenergized, branch conduit 36 is connected for fluid flow and pressure transmittal therethrough from master cylinder 20 to the rear brakes 16 and 18 through proportioning valve 32. A normally open pressure actuated switch 46 is positioned in the portion of conduit 26 directly connected with master cylinder 20 so as to sense the master cylinder output or supply pressure in conduit 26. This switch is closed when a predetermined master cylinder output pressure is attained in the rear brake circuit.

A normally open deceleration actuated switch 48 is provided and senses vehicle deceleration so that it is closed when a predetermined vehicle deceleration is attained during braking. A relay 50, including a solenoid 52, a normally open switch 54, and a normally closed switch 56, is provided. Another relay 58 is provided and includes a solenoid 60, a normally open switch 62, and a normally closed switch 64. A source of electrical energy schematically illustrated as a battery 66 is provided. One terminal of the battery is grounded at 68. The other terminal is connected by electrical conduit 70 to one side of the deceleration switch 48, to one side of pressure switch 46 by electrical conduit 72, and to one side of solenoid valve 44 by electrical conduit 74. Valve 44 has its other terminal connected by electrical conduit 76 to terminal 78 of switch 64. Terminal 80 of switch 64 is grounded through electrical conduit 82. The terminal 84 of switch 62 is electrically connected to terminal 80 of switch 64. The terminal 86 of switch 62 is electrically connected to one side of the relay solenoid 60 at a junction 88 and this junction is also electrically connected to terminal 90 of switch 56. Terminal 92 of switch 56 is grounded at 94.

The other side of switch 48 is connected by electrical conduit 96 to one side of solenoid valve 42, to terminal 98 of switch 54, and to one end of relay solenoid 52. The other end of solenoid 52 is grounded at 100. The other side of solenoid valve 42 is grounded at 102. Terminal 104 of switch 54 is electrically connected to junction 106 through electrical conduit 108. Electrical conduit 110 connects the other end of solenoid 60 and the other side of pressure switch 46 with junction 106.

In the normal condition of operation in which the brakes are not applied, there is no substantial pressure in conduits 24 and 26. Solenoid valve 44 is energized through electrical conduits 72, 74 and 76 and normally closed switch 64 so that the valve 44 is closed. Switches 46 and 48 are open, and therefore relays 50 and 58 are not energized, and solenoid valve 42 is open.

When a lightly loaded vehicle is braked, the deceleration actuated switch 48 is closed before sufficient master cylinder pressure is generated to close switch 46, since a higher deceleration will be obtained in proportion to the amount of master cylinder pressure supplied. This will energize solenoid valve 42 to close that valve, and will also energize relay 50 to close switch 54 and open switch 56. Thus the same voltage will be applied to both sides of open pressure switch 46 through electrical conduits 108 and 110. Relay 58 will not be energized since its holding switch 62 is open and relay switch 56 is also open. Thus, even with increasing braking pressures from master cylinder 20 which will close switch 46, relay 58 will not be energized and solenoids 42 and 44 will remain closed. Therefore pressure proportioning will occur only through proportioning valve 30. This valve is set to begin proportioning at a relatively low input pressure compared to the setting of proportioning valve 32, which is set to begin proportioning at a higher input pressure.

With a heavily loaded vehicle, the attainable deceleration in relation to the pressure supplied by the master cylinder is less, and therefore the pressure switch 46 is closed before sufficient deceleration is attained to close switch 48. This will energize solenoid 60 of relay 58 through electrical conduits 72 and 110 and switch 56. Energization of solenoid 60 causes switch 62 to close and provide a holding circuit between the solenoid 60 and ground 62. It will also open switch 64 and therefore deenergize solenoid valve 44, opening that valve. This places the fluid circuit to the rear brakes in the condition wherein braking pressure is delivered through valve 42 and is capable of being delivered through proportioning valves 30 and 32. When the pressure further increases to increase the deceleration so that switch 48 is closed, valve 42 is closed and relay 50 is energized to close switch 54 and open switch 56. Relay 58 will remain energized and therefore solenoid valve 44 will remain open. The brake system will then proportion through proportioning valve 32 at its higher proportioning pressure, as is desirable with a more heavily loaded vehicle, since the high pressures will be on both sides of proportioning valve 30, that valve will have no effective proportioning action.

Figure 3:
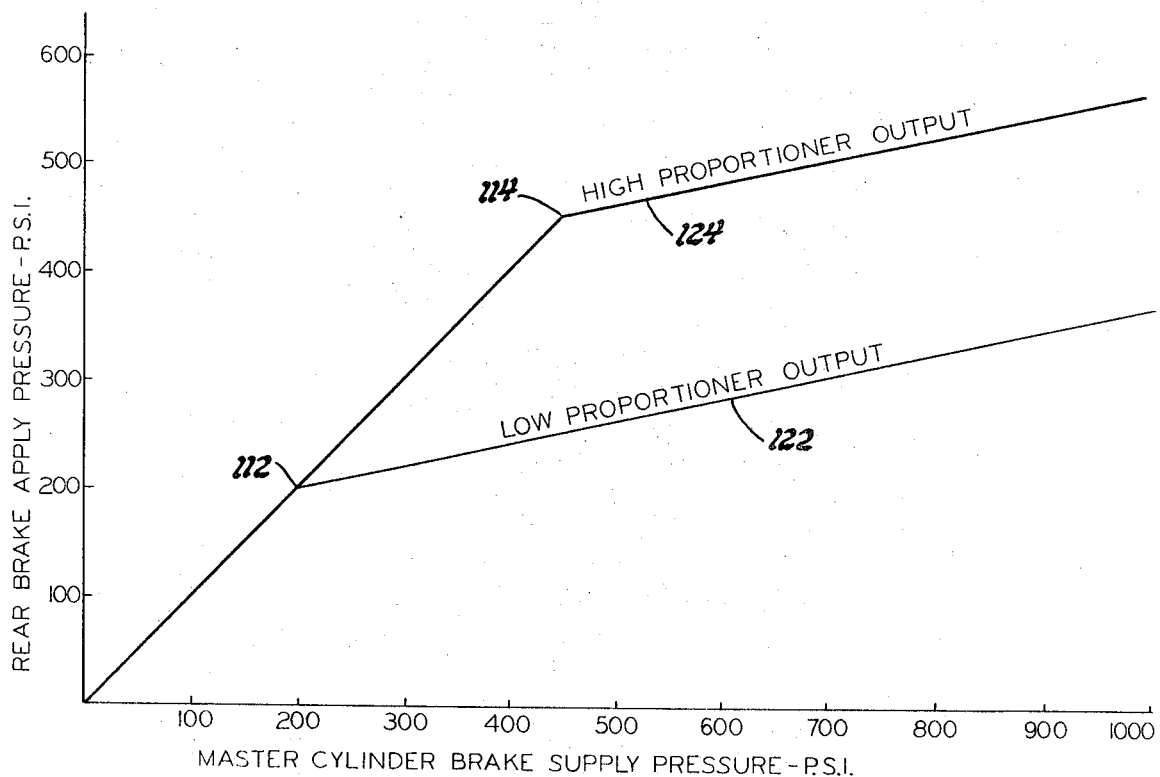
FIG. 3 is a graphic illustration of the performance of the system, with master cylinder brake supply pressure plotted against the rear brake apply pressure, and particularly showing the point at which the system proportioning valves begin to function.

Proportioning valve 30 is actuatable at a first predetermined master cylinder pressure level to begin proportioning brake apply pressure to the rear brakes. This level is substantially lower than the master cylinder pressure output level at which proportioning valve 32 can begin proportioning brake pressure to the rear brakes. These two pressure levels are shown respectively as points 112 and 114 in the graph of FIG. 3. In the particular arrangement from which this graph was made, the proportioning valve 30 begins to proportion pressure at approximately 200 p.s.i. master cylinder output pressure, while valve 32 begins to proportion at approximately 450 p.s.i.

FIG. 2 shows a graph of the different decelerations obtained by the same vehicle when the vehicle is lightly loaded and when it is heavily loaded, plotted against master cylinder output pressure. Curve 116 shows the higher decelerations obtained in relation to the master cylinder output pressures when the vehicle is lightly loaded. Curve 118 shows the relatively lower decelerations obtained in relation to the master cylinder output pressures when the vehicle is heavily loaded. The dashed line 120 represents a line used to provide a predetermined deceleration rate for the master cylinder pressure generated, and is referred to as a decision line. This line is established so that the deceleration curve 116 of a lightly loaded vehicle is above the line and the deceleration curve 118 for a heavily loaded vehicle is below the line. When the actual deceleration obtained in comparison to the actual master cylinder output pressure acting on pressure switch 46, as measured by the deceleration actuated switch 48, falls on the upper side of the decision line 120, the deceleration actuated switch 48 is actuated to connect electrical conduits 70 and 96 before the pressure switch 46 is actuated to electrically connected electrical conduits 72 and 110. This establishes the proportioning valve 30 as the control proportioning valve. When the master cylinder output pressure reaches the point 112 of FIG. 3, proportion valve 30 then proportions brake apply pressure to the rear brakes along curve 122.

When the actual deceleration obtained in relation to the master cylinder output pressure supplied falls below decision line 120 on curve 118, the deceleration is insufficient to actuate switch 48 before the pressure acting on switch 46 actuates that switch. Thus electrical conduits 72 and 110 are electrically connected to establish proportioning valve 32 as the control proportioning valve. When the master cylinder output pressure reaches point 114 of FIG. 3, proportioning valve 32 proportions brake apply pressure to the rear brakes along curve 124.

It is claimed:

1. A brake control system for proportioning brake supply pressure to brake apply pressure in accordance with a variable vehicle operational condition, said system comprising:
- a source of brake supply pressure;
- a brake selectively actuatable by brake apply pressure received from said source;
- conduit means operatively interconnecting said source and said brake;
- a plurality of brake pressure proportioning valves in said conduit means each having different brake supply pressure points at which they begin to proportion;
- and control means responsive to brake supply pressure from said source and a variable vehicle operational condition to establish a curvilinear relationship therebetween and to selectively integrate a selected one or more of said proportioning valves into operational fluid pressure relationship between said source and said brake in accordance with a predetermined desired curvilinear relationship between brake supply pressure and the variable vehicle operating condition as compared to said established curvilinear relationship.

2. A brake control system for proportioning brake supply pressure to brake apply pressure in accordance with a variable vehicle operational condition, said system comprising:
- a source of brake supply pressure;
- a brake selectively actuated by brake apply pressure received from said source;
- conduit means operatively interconnecting said source and said brake;
- first and second fluid pressure proportioning valves in said conduit means and having substantially different brake supply pressure points at which they begin to proportion;
- and control means responsive to brake supply pressure and a signal operatively reflecting vehicle load and having a desired vehicle load-brake supply pressure ratio provided and comparing the actual vehicle load-brake supply pressure ratio attained with the provided ratio such that with lighter vehicle loads a first control condition is generated and at heavier vehicle loads a second control condition is generated, said first control condition making said first proportioning valve operative to proportion brake supply pressure to said brake as brake apply pressure and said second control condition making said second proportioning valve operative to deliver brake pressure proportioned by it to said brake.

3. A brake control system for proportioning brake supply pressure to brake apply pressure in accordance with a variable vehicle operational condition, said system comprising:
- a source of brake supply pressure;
- a brake selectively actuatable by brake apply pressure received from said source;
- conduit means operatively interconnecting said source and said brake;
- first and second fluid pressure proportioning valves in said conduit means and having relatively low and high brake supply pressure points at which they begin to proportion;
- and control means responsive to brake supply pressure and the actual amount of vehicle deceleration obtained by the brake supply pressure being supplied and comparing the actual amount of vehicle deceleration with a predetermined decisional amount of vehicle deceleration for the brake supply pressure being supplied, and when said actual amount of vehicle acceleration is greater than said decisional amount of vehicle deceleration acting to establish said first proportioning valve as the controlling proportioning valve, and when said actual amount of vehicle deceleration is less than said decisional amount of vehicle deceleration acting to establish said second proportioning valve as the controlling proportioning valve.

4. A brake control system for proportioning brake supply pressure to brake apply pressure in accordance with a variable vehicle operational condition, said system comprising:
- a source of brake supply pressure;
- a brake selectively actuated by brake apply pressure received from said source;
- conduit means operatively interconnecting said source and said brake;
- a plurality of brake pressure proportioning valves in fluid parallel relation in said conduit means each having different brake supply pressure points at which they begin to proportion;
- and control means responsive to brake supply pressure from said source and a variable vehicle operational condition to establish a curvilinear relationship therebetween and to selectively integrate a selected one or more of said proportioning valves into operational fluid pressure relationship between said source and said brake in accordance with a predetermined desired curvilinear relationship between brake supply pressure and the variable vehicle operating connection as compared to said established curvilinear relationship.

5. A vehicle brake system comprising:
- a first brake fluid circuit and a second brake fluid circuit and a source of supply of brake fluid under pressure for said circuits, the first of said circuits being connected to a first set of wheel brakes and the second of said circuits being connected to a second set of wheel brakes;
- first and second proportioning valves in said first circuit for selectively proportioning brake pressure to the first set of wheel brakes, the first proportioning valve beginning proportioning action at a first pressure input level and the second proportioning valve beginning proportioning action at a second pressure input level substantially higher than the first pressure input level, and a bypass conduit in said first circuit selectively bypassing said proportioning valves;
- first normally open valve means in said bypass conduit actuatable to close said bypass conduit;
- second normally open valve means in series with one of said proportioning valves actuatable to fluidly block the transmission of brake pressure from said one proportioning valve to said first set of brakes;
- a first normally open pressure-closed switch sensing pressure in said first brake fluid circuit as received from said source;
- a second normally open deceleration-closed switch sensing attainment of a predetermined vehicle deceleration;
- first control means connected to actuate said first normally open valve means upon actuation of said second switch by attainment of the predetermined vehicle deceleration;

and second control means including a first relay and a second relay, said first relay being actuated by actuation of said first switch only when said second relay is not actuated, said second relay being actuated by said second switch, said second control means first relay controlling the actuation of said second normally open valve means.

* * * * *